(12) United States Patent
Battle et al.

(10) Patent No.: US 11,144,364 B2
(45) Date of Patent: Oct. 12, 2021

(54) SUPPORTING SPECULATIVE MICROPROCESSOR INSTRUCTION EXECUTION

(71) Applicant: International Business Machines Corporation, Armonk, NY (US)

(72) Inventors: Steven J. Battle, Austin, TX (US); Brandon R. Goddard, Kirkland, WA (US); Dung Q. Nguyen, Austin, TX (US); Joshua W. Bowman, Austin, TX (US); Brian D. Barrick, Pflugerville, TX (US); Susan E. Eisen, Round Rock, TX (US); David S. Walder, Austin, TX (US); Cliff Kucharski, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 308 days.

(21) Appl. No.: 16/257,259

(22) Filed: Jan. 25, 2019

(65) Prior Publication Data

US 2020/0241931 A1 Jul. 30, 2020

(51) Int. Cl.
| | | |
|---|---|---|
| *G06F 9/44* | (2018.01) | |
| *G06F 9/54* | (2006.01) | |
| *G06F 11/14* | (2006.01) | |
| *G06F 9/50* | (2006.01) | |
| *G06F 9/22* | (2006.01) | |
| *G06F 9/30* | (2018.01) | |
| *G06F 9/46* | (2006.01) | |

(52) U.S. Cl.
CPC ............ *G06F 9/5077* (2013.01); *G06F 9/223* (2013.01); *G06F 9/3013* (2013.01); *G06F 9/30105* (2013.01); *G06F 9/544* (2013.01); *G06F 9/3012* (2013.01); *G06F 9/30141* (2013.01); *G06F 9/461* (2013.01); *G06F 11/1402* (2013.01)

(58) Field of Classification Search
CPC .... G06F 9/5077; G06F 9/223; G06F 9/30105; G06F 9/3013; G06F 9/544; G06F 9/5061; G06F 9/3012; G06F 9/30123; G06F 9/30127; G06F 9/30141; G06F 9/461; G06F 9/462; G06F 9/3863; G06F 9/30036; G06F 11/1402; G06F 15/8053
USPC .... 712/4, 5, 9, 222, 225, 228; 718/102–108; 714/38.1
See application file for complete search history.

(56) References Cited

U.S. PATENT DOCUMENTS

| | | |
|---|---|---|
| 5,072,364 A | 12/1991 | Jardine |
| 7,069,411 B1 | 6/2006 | McMinn |
| 8,046,568 B2 | 10/2011 | Wilson |

(Continued)

OTHER PUBLICATIONS

Mell et al., "The NIST Definition of Cloud Computing", Recommendations of the National Institute of Standards and Technology, Special Publication 800-145, Sep. 2011, 7 pages.

(Continued)

*Primary Examiner* — Daniel H Pan
(74) *Attorney, Agent, or Firm* — David K. Mattheis; Maeve M. Carpenter

(57) ABSTRACT

Recovering microprocessor logical register values by: partitioning a register mapper by logical register type; providing a plurality of recovery ports; assigning a logical register type to a recovery port; receiving a restore required instruction; and mapping SRB (save and restore buffer) values to the register mapper by logical register type.

18 Claims, 5 Drawing Sheets

(56) References Cited

U.S. PATENT DOCUMENTS

| | | |
|---|---|---|
| 8,370,607 B2 | 2/2013 | Sun |
| 9,400,655 B2 | 7/2016 | Schon |
| 9,786,338 B2 | 10/2017 | Hinton |
| 2008/0082788 A1* | 4/2008 | Veidenbaum ......... G06F 9/3836 712/23 |
| 2008/0209175 A1* | 8/2008 | Brown ................ G06F 9/45504 712/208 |
| 2009/0089562 A1* | 4/2009 | Schuchman ........ G06F 9/30105 712/228 |
| 2011/0125988 A1* | 5/2011 | Ohnuki ............... G06F 9/30127 712/221 |
| 2017/0371673 A1 | 12/2017 | Fei |

OTHER PUBLICATIONS

Park et al., "Reducing Register Ports for Higher Speed and Lower Energy", Microarchitecture, 2002 (MICRO-35) Proceedings, 35th Annual IEEE/ACM International Symposium, pp. 171-182, Appears in MICRO 2002.

* cited by examiner

SUPPORTING SPECULATIVE MICROPROCESSOR INSTRUCTION EXECUTION

BACKGROUND

The disclosure relates generally to supporting the speculative execution of microprocessor instructions. The disclosure relates more particularly to recovering data logical register values after speculatively executing instructions.

The speculative execution of microprocessor instructions is used to improve the efficiency of instruction execution. Branching instructions provide an opportunity for speculative execution. As an example, a do loop may be executed along the loop branch repeatedly concurrent with other instructions and without any consideration for the loop counter value. This execution mode may provide a faster overall execution of the looped instructions. The mode of execution is also subject to mis-branching wherein the speculation has led to the execution of the incorrect instruction.

The loop counter instruction will eventually reach its terminal value. At this point the system must recover from any superfluous looping instruction execution. Recovery requires reestablishing the values of logical registers associated with a point in the execution prior to the mis-branching, a point prior to the loop counter terminating.

System architecture provides for storage of register values associated with each point in the stream of instruction execution. Recovery then includes retrieving the value of each register at the time before the mis-branching from the stored values.

SUMMARY

Aspects of the invention disclose methods, systems and computer readable media associated with recovering microprocessor logical register values by: partitioning a register mapper by a plurality of logical register types, providing a plurality of recovery ports, assigning a logical register type to a recovery port, receiving a restore required instruction, and mapping SRB (save and restore buffer) values to the register mapper by logical register type.

DETAILED DESCRIPTION

Figure 1:
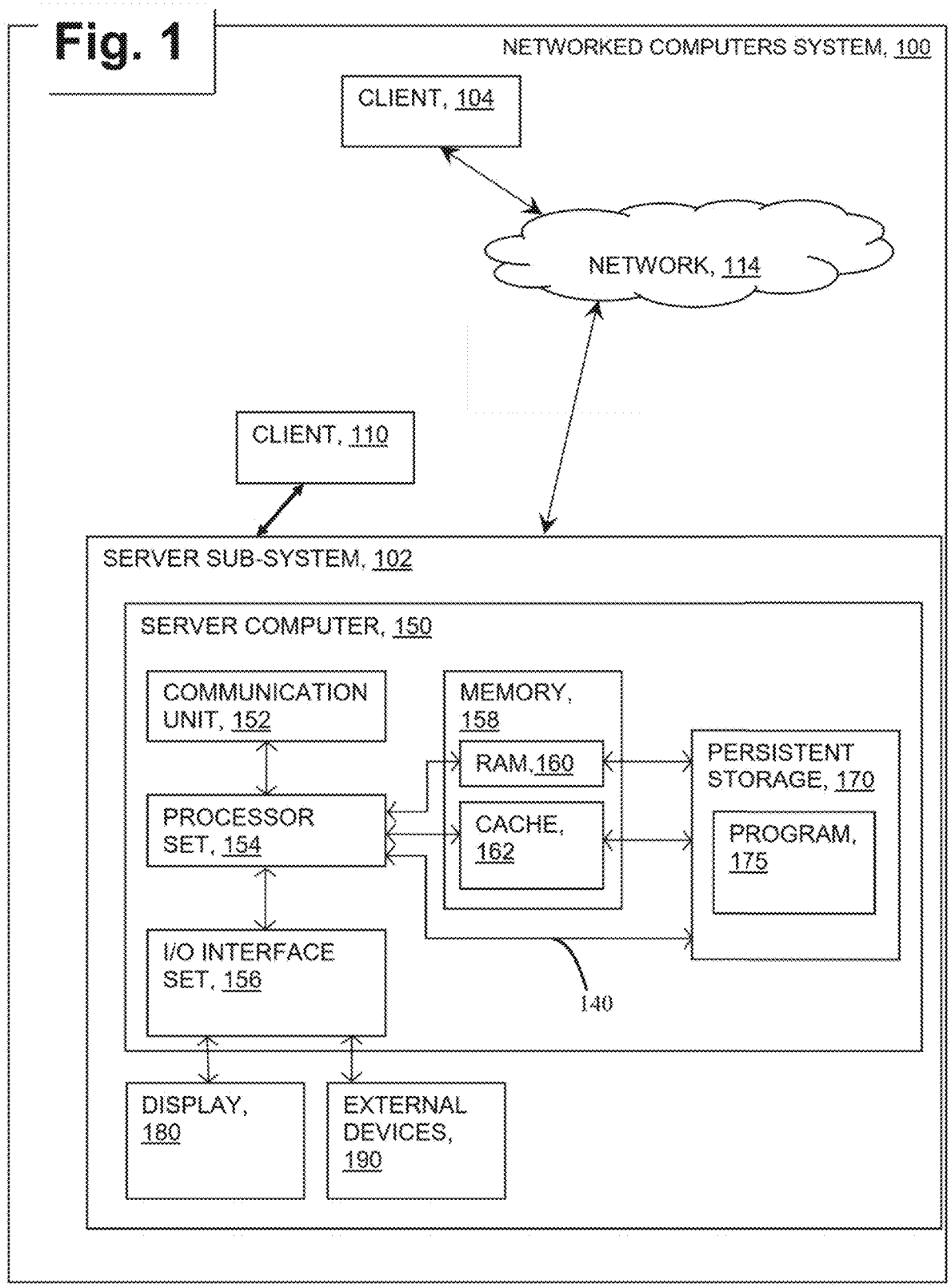
FIG. 1 provides a schematic illustration of a system, according to an embodiment of the invention.

Speculative execution of microprocessor instructions may improve the efficiency of microprocessor operation both in terms of reduced instruction latency and energy use. A microprocessor system management controller may speculatively execute instructions associated with a branching instruction concurrent with the execution of instructions relating to the branching decision. The instructions associated with the loop portion of an iterative do loop may be executed concurrent with the instructions associated with the control of the loop's iterations. In this manner, the processor can save time when the control instructions return a result indicating the necessity of another iteration since that iteration has already been speculatively executed. This speculative execution comes at a cost as, when the control instructions return a result indicating that the loop's iterations should cease, the system will need to recover from the results of instructions speculatively executed concurrent with the control instructions.

As an example, a program including a do until n=10 loop may be executed by the processor in a speculative manner. In this execution, the instructions of the looped branch may be executed after n=1, but while the instructions resulting in the determination that n=2, are being executed. As the processor dispatches and executes each instruction, the logical register values associated with the machine state associated with the instructions at execution are copied from the system register mapper to save and restore buffer (SRB) locations. The copied register values are stored along with the relevant instruction tag (ITAG) associated with the executed instruction. The register values are mapped to the SRBs on an as available basis such that any mapper register may be mapped to any SRB register. This may continue with speculative execution of the instructions while the value of n, increases. A last round of speculative execution occurs after n=9, and while the new value of n, is being determined. This round of instruction will be identified as a mis-branching once n=10, has completed. The system will then need to recover to a point before the mis-branching where n=9, and the speculative execution has not yet begun. Such an occurrence is considered a flush-recovery event. Exceptions triggered by instruction executions and page load faults my also lead to flush-recovery events. The identification of the mis-branching causes the system to further identify the last instruction (by ITAG) executed prior to the mis-branching, and to request a flush of the system register mapper and a recovery of the mapper to a point prior to the mis-branching ITAG execution.

Each SRB entry also carries a flush recovery field where the system can set a flag indicating that the register needs to be restored to the mapper after a flush-recovery incident. After the mis-branching has been identified and associated with a particular ITAG, the system sets the flush-recovery flag for the SRB values associated with that ITAG and triggers a recovery of the system mapper of the values associated with the ITAG.

The mapper may comprise any number of registers which must be recovered. As an example, the mapper may comprise ninety-six registers which must be recovered from the SRB. As the mapper values are copied to the SRBs per execution slice in an as available manner, recovery of all ninety-six register values requires potentially connecting each SRB location to each of the ninety-six mapper registers creating a significant infrastructure burden for the architecture. Alternatively, the ninety-six registers may be recovered in a serial fashion requiring significant delay as each SRB value is associated with the correct mapper register and restored.

Serial recovery of the register mapper requires significant time. Parallel recovery requires significant resources in architecture wherein each SRB is wired with a recovery port to each mapper register, ninety-six recovery ports per SRB. What is needed is a system and method to facilitate rapid recovery of the mapper after a mis-branching during speculative instruction execution without carrying the infrastructure penalty associated with an any-to-any wiring scheme between SRBs and the register mapper.

The disclosed methods, systems, and program products rapidly recover logical register values after mis-branching. In an embodiment, activities carried out by one or more computer processors include partitioning a system logical mapper by logical register type into a plurality of partitions. In this embodiment, the mapper may be partitioned into a general-purpose register (GPR) partition, a floating-point register/lower vector scalar register (FPR/VSR) partition, and an upper vector scalar register (VSR) partition. As an example, a logical register mapper may have ninety-six registers, thirty-two GPR registers, thirty-two FPR/VSR registers, and thirty-two VSR registers. The most significant bit of the each of the mapper registers may be used to differentiate the various logical register assignments with registers 0-31 being GPR, 32-63 being FPR/VSR, and 64-95 being the VSR registers.

As instructions are executed, the logical register mapper values are copied to save and restore buffer locations of the same logical register type. So GPR values are copied to GPR portions of the SRB and so on. Recovery ports are provided between the SRB locations and the logical register mapper partitions. Recovery ports may comprise wired connections in the architecture of a processor unit linking the SRB register locations with the registers of the logical register mapper locations. As an example, each partition of the mapper, the thirty-two GPR registers, thirty-two FPR/VSR registers, and thirty-two VSR registers, may have dedicated recovery ports to similar partitions of the SRB such that each mapper register is copied to an SRB of the same logical register type by way of recovery ports having the same assigned logical register type. The copying of mapper values to SRB locations occurs on a per slice basis as instructions are executed. The SRB contains the mapper register value, the ITAG of the instruction, a register file associated with the value and a flush-recovery field.

After a flush-recovery event, such as a system exception, the system will provide a restore required instruction. The flush recovery field of the SRBs associated with the mapper value at a point prior to the flush-recovery event will be set to indicate the need to recover these values to the mapper.

The SRB values will then be restored to the mapper registers using the recovery ports. As the SRB, recovery ports and mapper registers are each partitioned by logical type, the system may recover mapper registers in parallel allowing multiple registers to be recovered each clock cycle. In an embodiment, two each of GPR, FPR/VSR, and VSR register values may be recovered from each of four execution slices stored in the SRB locations per clock cycle. The recovered values may then be mapped to the register mapper by way of the logical register specific recovery ports. The ninety-six register values of the mapper recovered two per cycle from each of the four slices are thus completely recovered in only four cycles.

In this embodiment, each logical portioned register of the SRB is wired by recovery ports to each of the corresponding thirty-two mapper registers of the same logical register type, rather than being wired directly to each of the entire ninety-six registers of the mapper. This portioning of the SRB, recovery ports and mapper enables rapid parallel recovery of the mapper from the SRB.

FIG. 1 provides a schematic illustration of network and computing resources associated with practicing the disclosed inventions. As shown in the figure, a networked computer system 100 connects wirelessly to server sub-system 102. Client device 104 connects wirelessly to server sub-system 102 via network 114. Client devices 104 and 110 comprise instruction scheduling programs (not shown) together with sufficient computing resource (processor, memory, network communications hardware) to execute the program. As shown in FIG. 1, server sub-system 102 comprises a server computer 150. FIG. 1 depicts a block diagram of components of server computer 150 within a networked computer system 100, in accordance with an embodiment of the present invention. It should be appreciated that FIG. 1 provides only an illustration of one implementation and does not imply any limitations with regard to the environments in which different embodiments can be implemented. Many modifications to the depicted environment can be made.

Server computer 150 can include processor(s) 154, memory 158, comprising random access memory (RAM) 160 and cache memory 162, persistent storage 170, communication unit 152, input/output (I/O) interface(s) 156 and communications fabric 140. Communications fabric 140 provides communications between cache 162, memory 158, persistent storage 170, communication unit 152, and input/output (I/O) interface(s) 156. Communications fabric 140 can be implemented with any architecture designed for passing data and/or control information between processors (such as microprocessors, communications and network processors, etc.), system memory, peripheral devices, and any other hardware components within a system. For example, communications fabric 140 can be implemented with one or more buses.

Memory 158 and persistent storage 170 are computer readable storage media. In this embodiment, memory 158 includes (RAM) 160 and cache memory 162. In general, memory 158 can include any suitable volatile or non-volatile computer readable storage media. Cache memory 162 is a fast memory that enhances the performance of processor(s) 154 by holding recently accessed data, and data near recently accessed data, from memory 158.

Program instructions and data used to practice embodiments of the present invention, e.g., the software and data 175, are stored in persistent storage 170 for execution and/or access by one or more of the respective processor(s) 154 of server computer 150 via cache 162. In this embodiment, persistent storage 170 includes a magnetic hard disk drive. Alternatively, or in addition to a magnetic hard disk drive, persistent storage 170 can include a solid-state hard drive, a semiconductor storage device, a read-only memory (ROM), an erasable programmable read-only memory (EPROM), a flash memory, or any other computer readable storage media that is capable of storing program instructions or digital information.

The media used by persistent storage 170 may also be removable. For example, a removable hard drive may be used for persistent storage 170. Other examples include optical and magnetic disks, thumb drives, and smart cards that are inserted into a drive for transfer onto another computer readable storage medium that is also part of persistent storage 170.

Communications unit 152, in these examples, provides for communications with other data processing systems or devices, including resources of client computing devices 104, 106, 108, 110, and 112. In these examples, communications unit 152 includes one or more network interface cards. Communications unit 152 may provide communications through the use of either or both physical and wireless communications links. Software distribution programs, and other programs and data used for implementation of the present invention, may be downloaded to persistent storage 170 of server computer 150 through communications unit 152.

I/O interface(s) 156 allows for input and output of data with other devices that may be connected to server computer 150. For example, I/O interface(s) 156 may provide a connection to external device(s) 190 such as a keyboard, a keypad, a touch screen, a microphone, a digital camera, and/or some other suitable input device. External device(s) 190 can also include portable computer readable storage media such as, for example, thumb drives, portable optical or magnetic disks, and memory cards. Software and data 175 on server computer 150, can be stored on such portable computer readable storage media and can be loaded onto persistent storage 170 via I/O interface(s) 156. I/O interface(s) 156 also connect to a display 180.

Display 180 provides a mechanism to display data to a user and may be, for example, a computer monitor. Display 180 can also function as a touch screen, such as a display of a tablet computer.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 2:
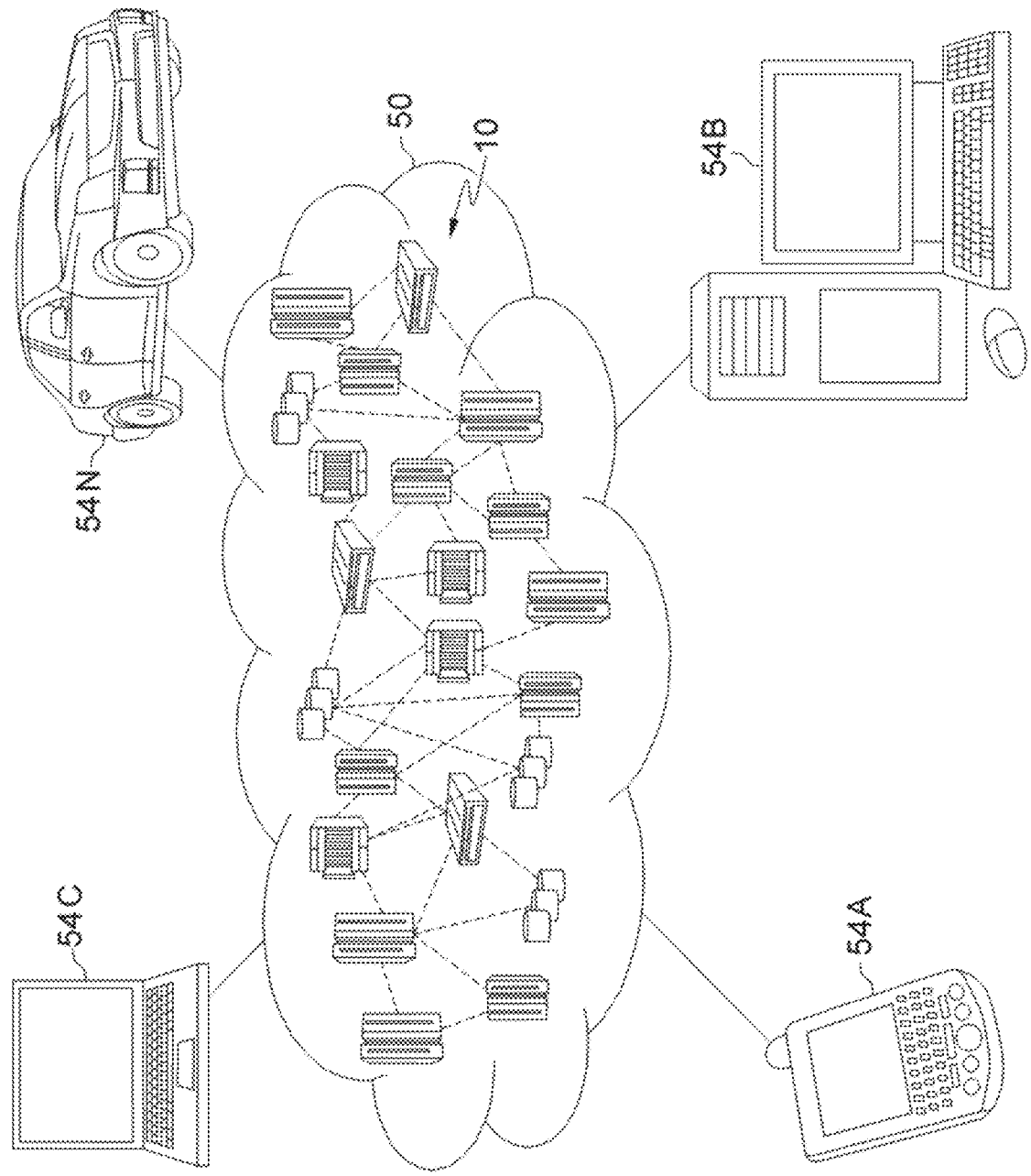
FIG. 2 depicts a cloud computing environment, according to an embodiment of the invention.

Referring now to FIG. 2, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 2 are intended to be illustrative only and that computing nodes 10 and cloud computing environment 50 can communicate with any type of computerized device over any type of network and/or network addressable connection (e.g., using a web browser).

Figure 3:
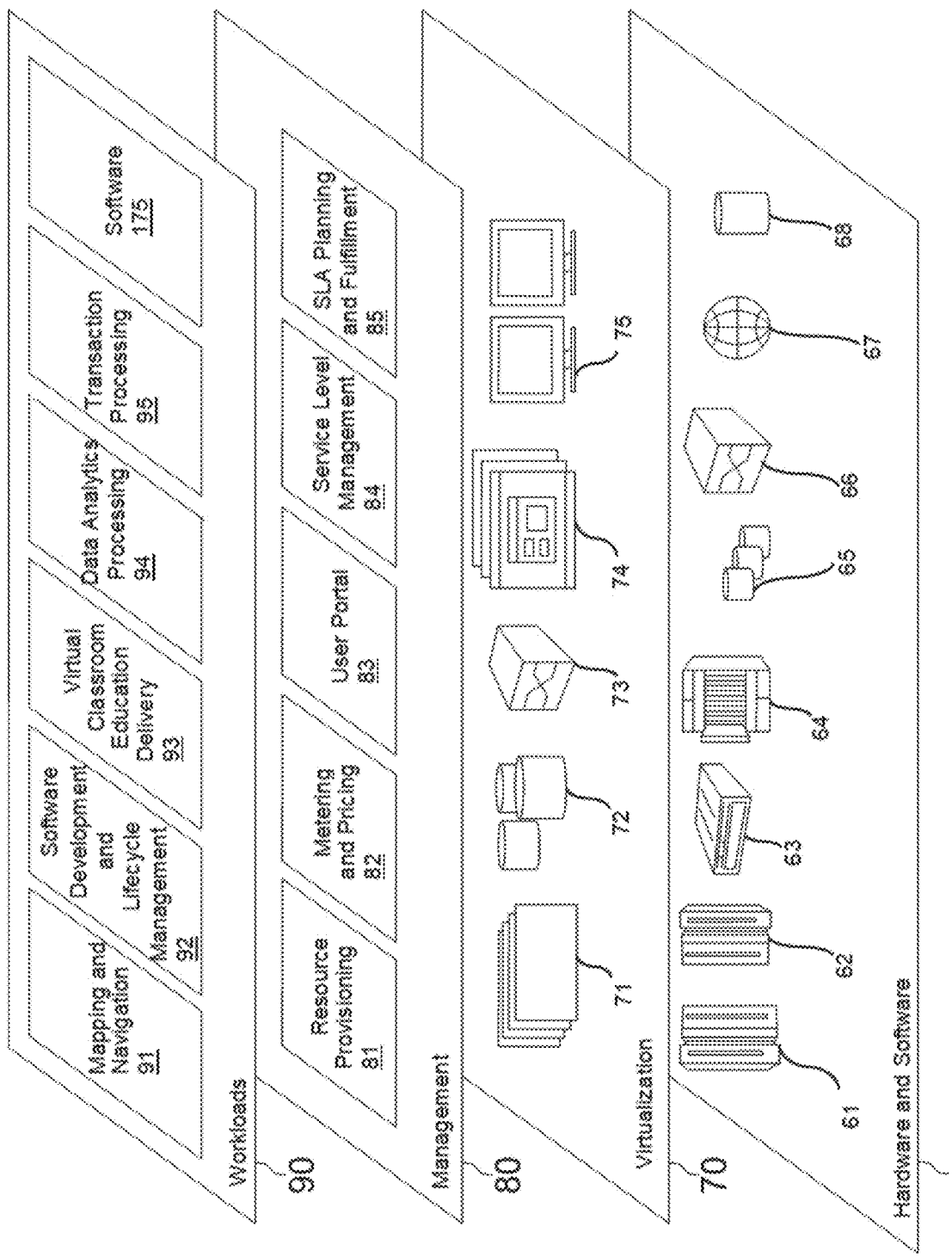
FIG. 3 depicts abstraction model layers, according to an embodiment of the invention.

Referring now to FIG. 3, a set of functional abstraction layers provided by cloud computing environment 50 (FIG. 2) is shown. It should be understood in advance that the components, layers, and functions shown in FIG. 3 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and software and data 175.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

As the processor dispatches and executes each instruction, the logical register values associated with the machine state associated with the instructions at execution are copied from the system register mapper to save and restore buffer (SRB) locations. The copied register values are stored along with the relevant instruction tag (ITAG) associated with the executed instruction. In an embodiment, the register values are mapped to the SRBs by logical register type such that the SRB register type corresponds to the register type of the originating register.

Figure 4:
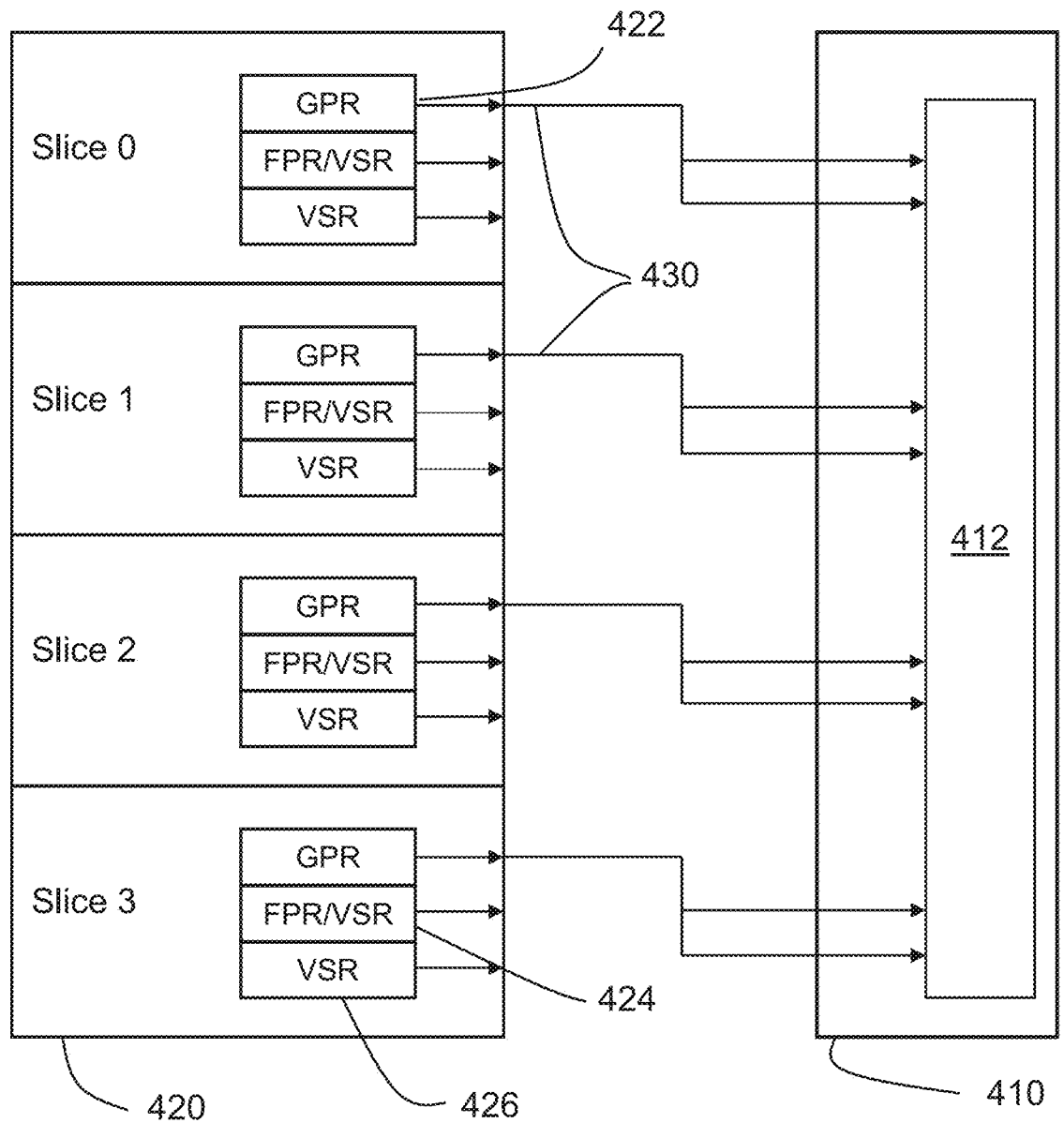
FIG. 4 provides a flowchart depicting an operational sequence, according to an embodiment of the invention.

FIG. 4 illustrates a portion of the recovery of the mapper values from the SRBs according to an embodiment of the invention. The figure provides an illustration of the recovery of eight values during a single clock cycle from the SRBs. As illustrated in the figure, the eight values of the GPR portion of the register mapper 410, are recovered two each from four execution slices stored in GPR partitions 422 of SRBs 420. The values are recovered to the mapper 410 from the SRBs 420 along recovery ports 430 assigned as GPR recovery ports between the four SRB slices 420 and the GPR mapper partition 410 to GPR mapper word 412. Similarly, recovery of two each of FPR/VSR and VSR values from the FPR/VSR 424 and VSR 426 logical partitions of the SRBs 420 along FPR/VSR and VSR recovery ports (not shown) to FPR/VSR and VSR partitions of the mapper (not shown) also occurs during the same clock cycle.

Figure 5:
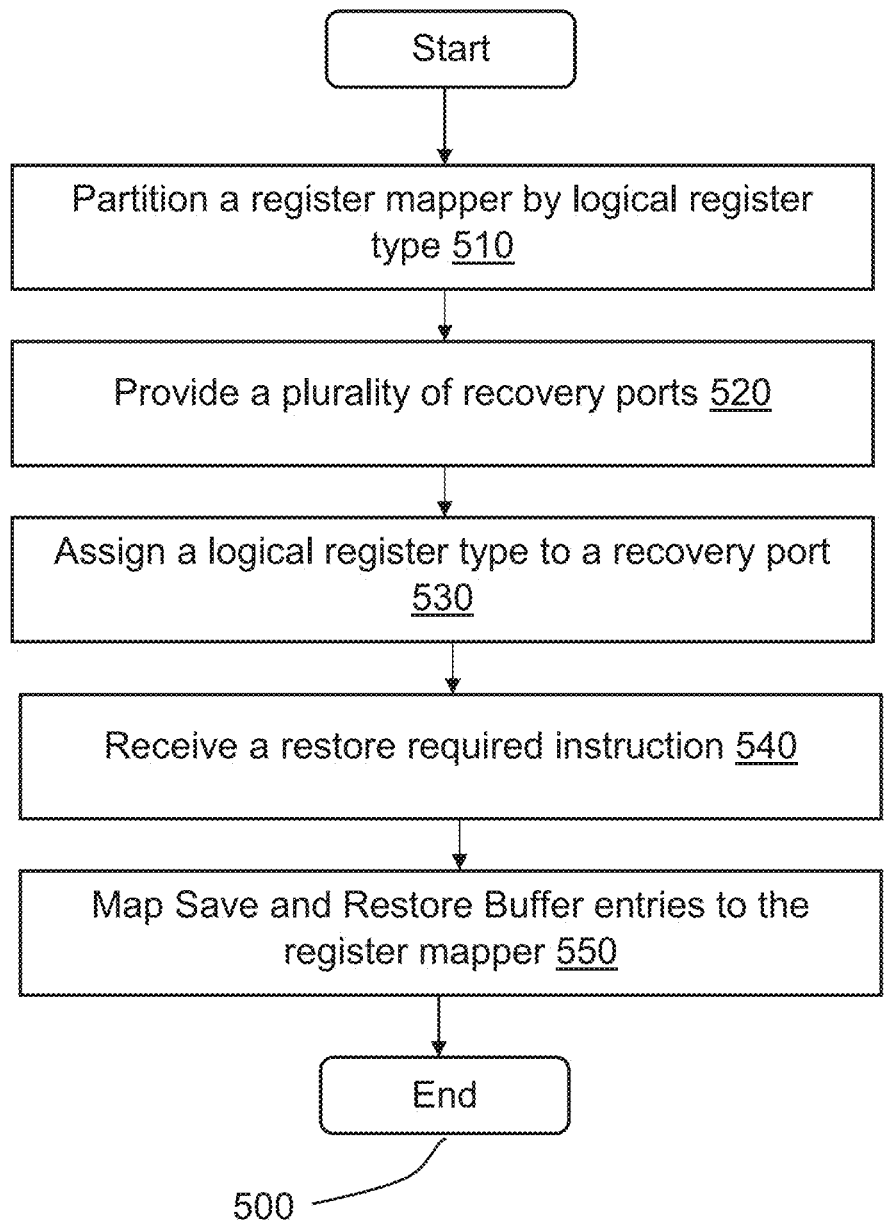
FIG. 5 provides a flowchart illustrating an operational sequence, according to an embodiment of the invention.

Flowchart 500 of FIG. 5 illustrates an operational sequence associated with an embodiment of the disclosure. The sequence presents an embodiment executed by software 175 illustrated in FIG. 1. After program start, a register mapper is partitioned by logical register type at 510. In an embodiment, logical register types GPR, FPR/VSR, and VSR may be used to partition the mapper. Integer registers, character registers and array registers may additionally be used partition the mapper. A plurality of recovery ports between save and restore buffer locations and the register mapper are provided at 520. The recovery ports are assigned to logical register type at 530. In an embodiment, the plurality of recovery ports are distributed evenly among the three logical register types of the mapper partition. In an embodiment, the recovery ports may be distributed in accordance with a register distribution associated with a specialized architecture of the processor. In this embodiment the recovery ports may be distributed in accordance with the distribution of the SRBs of the architecture. At 540, the system receives a restore required instruction associated with a flush-recovery event. The restore required instruction includes a pointer associated with the last properly executed instruction ITAG and indicating the location within the SRB that the relevant register values are located. The relevant SRB register values are then mapped from the indicated locations to the logical register mapper. After the mapping has occurred, the instruction ITAG prior to the instruction which triggered the flush recovery event may be re-executed. At 550 the save and restore buffer values are mapped to the register mapper by logical register type using the recovery ports.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application or technical improvement over technologies found in the marketplace, or to enable others of ordinary skill in the art to understand the embodiments disclosed herein.

What is claimed is:

1. A computer implemented method for recovering microprocessor logical register values, the method comprising:
   partitioning, by one or more computer processors, a register mapper by logical register type, the register mapper comprising a plurality of logical register types;
   providing, by one or more computer processors, a plurality of recovery ports;
   assigning, by one or more computer processors, a logical register type to a recovery port;
   receiving, by one or more processors, a restore required instruction; and
   mapping SRB (save and restore buffer) values, by one or more computer processors, to the register mapper by logical register type wherein mapping SRB values to the register mapper by logical register type comprises assigning, by one or more computer processors, SRB values to recovery ports according to logical register most significant bit values.

2. The computer implemented method according to claim 1, wherein partitioning a register mapper by logical register type comprises partitioning, by one or more computer processors, the register mapper into a GPR (general purpose register) mapper, a FPR (floating point register/lower vector scalar register) mapper, and a VSR (upper vector scalar register) mapper.

3. The computer implemented method according to claim 1 further comprising speculatively executing instructions by one or more computer processors.

4. The computer implemented method according to claim 3 further comprising recovering, by one or more computer processors, from a flush-recovery event by:
receiving, by one or more computer processors, a flush recovery instruction including an ITAG;
mapping SRB values associated with the ITAG to the logical register mapper by one or more computer processors; and
executing the instruction having the ITAG by one or more computer processors.

5. The computer implemented method according to claim 1 wherein mapping SRB entries to the register mapper by logical register type comprises concurrently mapping, by one or more computer processors, multiple SRB values per microprocessor clock cycle.

6. The computer implemented method according to claim 1 wherein mapping SRB values to the register mapper by logical register type comprises concurrently mapping, by one or more computer processors, multiple SRB values per microprocessor clock cycle wherein the multiple SRB values comprise multiple logical register types.

7. A computer program product for recovering microprocessor logical register values, the computer program product comprising one or more computer readable storage devices and program instructions stored on the one or more computer readable storage devices, the program instructions comprising:
programmed instructions partitioning a register mapper by logical register type;
programmed instructions assigning a logical register type to a recovery port;
programmed instructions receiving a restore required instruction; and
programmed instructions mapping SRB (save and restore buffer) values to the register mapper by logical register type wherein mapping SRB values to the register mapper by logical register type comprises assigning, by one or more computer processors, SRB values to recovery ports according to logical register most significant bit values.

8. The computer program product according to claim 7, wherein partitioning a register mapper by logical register type comprises programmed instructions partitioning the register mapper into a GPR (general purpose register) mapper, a FPR (floating point register/lower vector scalar register) mapper, and a VSR (upper vector scalar register) mapper.

9. The computer program product according to claim 7, further comprising:
programmed instructions speculatively executing instructions.

10. The computer program product according to claim 9, further comprising programmed instructions recovering from a flush-recovery event by:

programmed instructions for receiving a flush recovery instruction including an ITAG;
programmed instructions for mapping SRB values associated with the ITAG to the logical register mapper; and
programmed instructions for executing the instruction having the ITAG.

11. The computer program product according to claim 7, wherein mapping SRB values to the register mapper by logical register type comprises programmed instructions concurrently mapping multiple SRB values per microprocessor clock cycle.

12. The computer program product according to claim 7 wherein mapping SRB values to the register mapper by logical register type comprises programmed instructions concurrently mapping multiple SRB values per microprocessor cycle wherein the multiple SRB values comprise multiple logical register types.

13. A computer system for recovering microprocessor logical register values, the computer system comprising:
one or more computer processors;
one or more computer readable storage devices;
program instructions stored on the one or more computer readable storage devices for execution by the at least on computer processor, the program instructions comprising:
programmed instructions partitioning a register mapper by logical register type;
programmed instructions assigning a logical register type to a recovery port;
programmed instructions receiving a restore required instruction; and
programmed instructions mapping SRB (save and restore buffer) values to the register mapper by logical register type wherein mapping SRB values to the register mapper by logical register type comprises assigning, by one or more computer processors, SRB values to recovery ports according to logical register most significant bit values.

14. The computer system according to claim 13, wherein partitioning a register mapper by logical register type comprises programmed instructions partitioning the register mapper into a GPR (general purpose register) mapper, a FPR (floating point register/lower vector scalar register) mapper, and a VSR (upper vector scalar register) mapper.

15. The computer system according to claim 13, wherein mapping SRB values to the register mapper by logical register type comprises programmed instructions assigning SRB values to recovery ports according to logical register most significant bit values.

16. The computer system according to claim 13, further comprising:
programmed instructions speculatively executing instructions.

17. The computer system according to claim 16, further comprising programmed instructions recovering from a flush-recovery event by:
programmed instructions for receiving a flush recovery instruction including an ITAG;
programmed instructions for mapping SRB values associated with the ITAG to the logical register mapper; and
programmed instructions for executing the instruction having the ITAG.

18. The computer system according to claim 13, wherein mapping SRB values to the register mapper by logical register type comprises programmed instructions concurrently mapping multiple SRB values per microprocessor clock cycle.

* * * * *